Nov. 4, 1969     G. T. KULZER     3,475,884
FILTER BAG COLLAR
Filed May 9, 1966
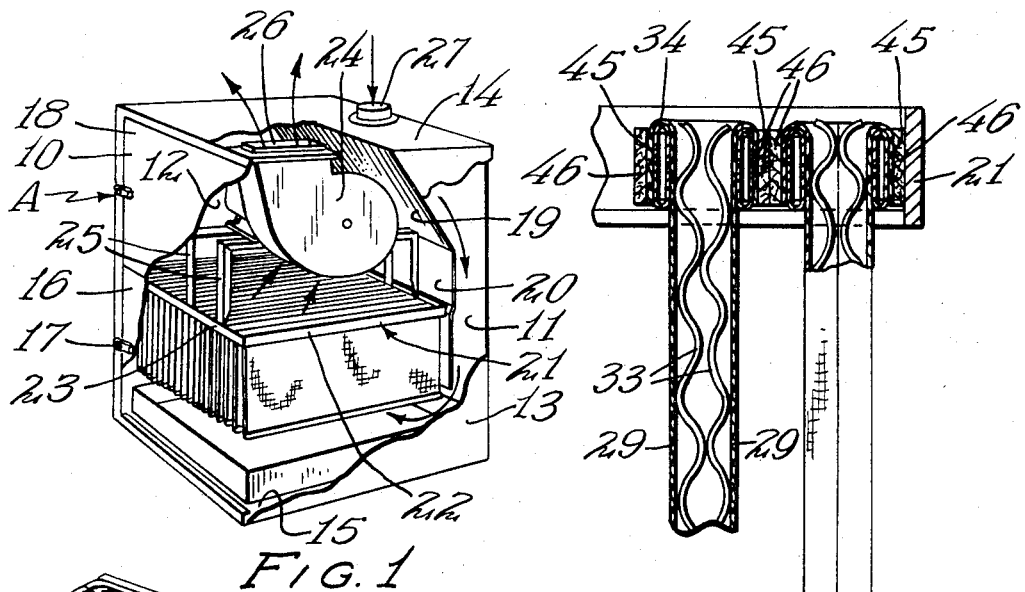
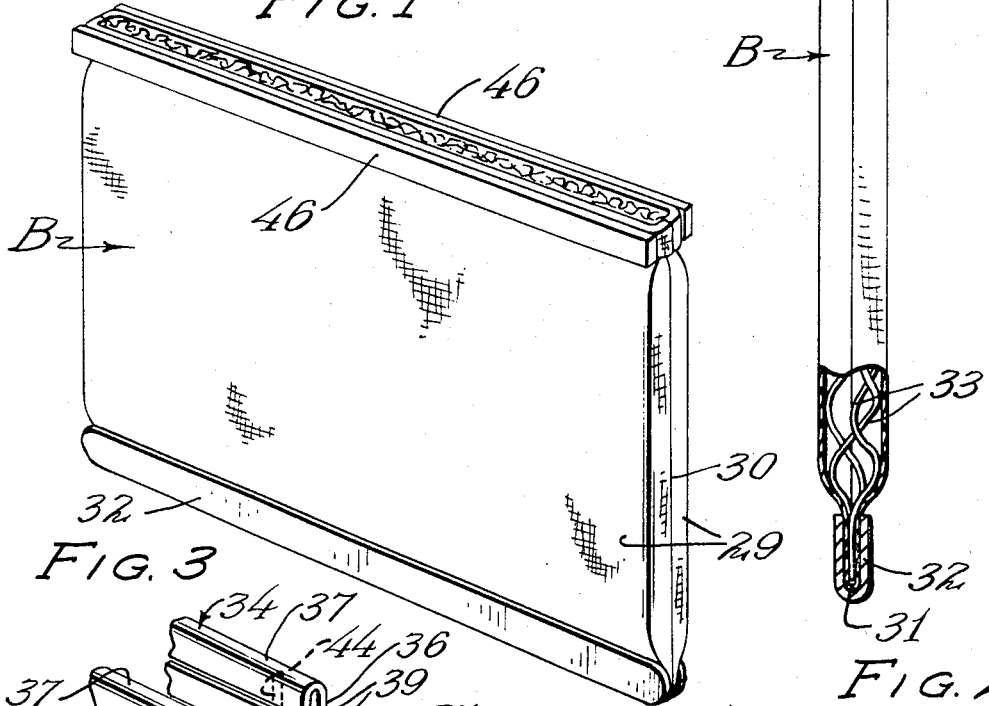
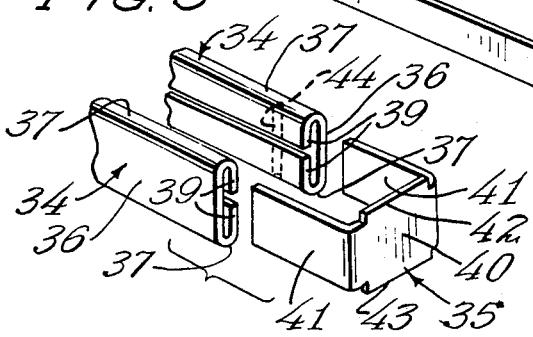
INVENTOR
GENE T. KULZER
BY *Robert M. Dunning*
ATTORNEY

United States Patent Office 3,475,884
Patented Nov. 4, 1969

3,475,884
FILTER BAG COLLAR
Gene T. Kulzer, St. Paul, Minn., assignor to Torit Manufacturing Company, a corporation of Minnesota
Filed May 9, 1966, Ser. No. 548,648
Int. Cl. B01d 29/24
U.S. Cl. 55—341     2 Claims

ABSTRACT OF THE DISCLOSURE

A filter bag collar to support an open ended filter bag of the type used in filter housings. The device includes a pair of parallel tubular flattened frame sides connected by end clips. The clips are V-shaped and fit into the open ends of the tubular frame sides. The open end of the bag extends upwardly through the collar and is folded down to encircle the collar and is attached thereto.

---

This invention relates to an improvement in filter bag collars and deals particularly with a substantially rectangular support, for the end of an elongated cloth filter which is effective in operation and simple in construction.

For numerous years dust filters have been produced including a series of parallel generally rectangular filter bags made of porous cloth which is of sufficiently fine mesh to prevent the dust in dust laden air therethrough. These filter bags are usually supported in substantially vertical planes and usually comprise a pair of fabric panels connected together along their vertical side edges and along their lower edge. The upper edges of the bags are open, and a means provided within the bag to prevent the bag from collapsing in use. The dust laden air is introduced about the outer surfaces of the bag, and air is drawn through the bag from the outside surfaces thereof to the inside surfaces and through the open upper end thereof. The dust, being unable to penetrate the fabric, collects on the outside surface of the bag. A means may be provided for vibrating or otherwise disturbing the position of the bags for shaking the particles of dust from outer surfaces of the bags.

An object of the present invention presides in the provision of an elongated substantially rectangular frame for supporting the open upper ends of the bag. In the preferred form, these frames include a pair of parallel flattened tubes or channel-shaped members, the channel-shaped members having inwardly turned opposed flanges which produce, in effect, an elongated flattened tube which may have a longitudinally slotted or slitted inner surface. The two tubes are of equal length and connected at opposite ends by a pair of U-shaped connecting members which telescope into the ends of the tubes or channels to hold them in properly spaced relation. In preferred form, the base portion of each U-shaped connecting member is substantially equal in width to the width of the tubes or channels, thereby forming a substantially rectangular frame which is of substantially equal height throughout. While rectangular bag supporting frames have been previously produced, these have comprised welded metal structures which are costly to assemble and produce. One of the features of the present invention lies in the fact that the frames may be automatically produced mechanically.

In producing the filter collars, a suitable machine supports the two frame sides in spaced parallel relation, and forces the ends of the two connecting clips into telescoped relation with the frame sides. The end portions of the frame sides are then crimped or kinked to lock the structure in proper form.

A further feature of the present invention resides in a filter bag collar of the type described comprising a rectangular body through which the bag extends, and over which the open upper end of the bag is folded. The upper end of the bag is folded over and downwardly over the periphery of the collar and is adhered thereto by vertical means. Sealing strips of felt or other somewhat resilient material may be applied to opposite sides of the collar outwardly of the open end of the bag and adhered or otherwise secured in place. The sealing strip on opposite sides of the collars are designed to seal against the similar sealing strips of adjoining collars to insure the passage of air through the fabric forming the bags rather than between the bags.

These and other objects and novel features of the present invention will be more clearly and fully set forth in the following specification and claims.

In the drawings forming a part of the specification:

FIGURE 1 is a perspective view of a cabinet-type dust collector showing the general arrangement of the parts therein.

FIGURE 2 is a vertical sectional view through portions of adjacent filter bags showing the general construction thereof.

FIGURE 3 is a perspective view of one of the filter bags removed from the filter cabinet.

FIGURE 4 is a perspective view of one end of the bag collar showing the U-shaped connecting member and its relationship to the opposed tubular or channel-shaped sides of the collar.

FIGURE 1 of the drawings is designed to illustrate diagrammatically a dust collector of a cabinet-type in which a dust filter bag of the type disclosed and described may be used. In general, the filter cabinet is indicated at and includes a pair of parallel side walls 10 and 11 which are connected along vertical corners to a second pair of parallel side walls 12 and 13. The cabinet also includes a top wall 14 and a bottom wall 15 forming an air-tight enclosure with the exception of the inlet and outlet openings, which will be described. The wall 10 is shown as provided with doors 16 and 18 not hinged. The opposite sides of the doors are normally held closed by suitable latches 17, as will be understood. A baffle wall within the cabinet is provided with an inclined upper portion 19 extending from the side wall 12 to the side wall 13, and inclining from the top panel 14 toward the side wall 11. A vertical baffle wall 20 forms a continuation from the lower edge of the inclined baffle 19 and it extends in parallel spaced relation to the side wall 11. A rectangular supporting frame 21 includes parallel sides such as 22 which are in sealed relation to the parallel side wall 12 and 13, and parallel sides 23 which are sealed relative to the side wall 10 and the baffle wall 20. The frame 21 is designed to support the filter bags B in such a manner that the only communication between the area of the cabinet above the frame 21 and the area below this frame is through the filter bags when the parallel filter bags are in supported position as indicated in FIGURE 1.

A suction fan 24 is supported by a suitable framework 25 extending upwardly from the frame 21. This suction fan 24 has an axial inlet between the body of the fan and the drive motor. By means of the suction created by the fan 24, air will enter the cabinet, flow downwardly between the baffle 19, 20 and the side wall 11 of the cabinet and to the area of the cabinet beneath the frame 21.

The filter bag B are usually formed of two substantially rectangular fabric panels 29, which are connected along opposite edges as along seams 30. In actual practice, the two panels 29 comprise a single elongated strip of fabric which is folded along the lower edge 31 thereof. A substantially U-shaped metal clip 32 preferably extends along the lower edge of each bag, and the sides of the U-shaped member are clipped together to clamp the lower edge of the bag therebetween. The main purpose of the U-shaped member 32 is to provide sufficient weight at the lower edge of each bag to retain it in its vertical position, and to prevent portions of the bag from being drawn upwardly by the effect of a partial vacuum within the bag. As is indicated in FIGURES 2 and 3 of the drawings, light wire mesh 33 or other suitable material is enclosed within the interior of each of the bags to prevent the panels 29 from collapsing together and to insure that the entire inner surface of each bag is subjected to a partial vacuum.

The collar which supports the upper end of each bag B is formed of a pair of spaced parallel side members 34 which are held in parallel spaced relation by U-shaped end clips 35. The collar sides 34 may be a flattened tubing having substantially parallel inner and outer sides. It also may comprise what may be termed a channel-shaped form, the base portion 36 of each channel forming the outer parallel portion of the sides, and the upper and lower walls of the channel, indicated at 37 extending inwardly. Opposed inturned flanges 39 form the inner opposed surfaces of the frame sides 34, the flanges 39 terminating in slightly spaced or in edge abutting relation.

The end connecting members 35 includes a base panel 40 which forms the end portions of the frame and a pair of parallel side portions 41 which are designed to telescope into the ends of the frame sides 34. As is best indicated in FIGURE 4 of the drawings, the base wall 40 of each clip is provided with upwardly and downwardly extending lips 42 and 43 which are of a vertical length substantially equal to the thickness of the top and bottom walls 37 of the frames 34. As a result, the base walls 40 which form the ends of the frame unit are substantially flush with the upper and lower surfaces of the frame sides.

As is best illustrated in FIGURE 2 of the drawings, as well as in FIGURE 3 thereof, the upper edges of the two panels 29 are extended through the rectangular assembled metal collar, and the upper end of each of the bags is folded down outwardly of the frame sides and the frame end. FIGURE 2 of the drawings discloses the upper end portions 45 of the bag panels folded downwardly over the outer surfaces of the frame sides 34. The bag is properly proportioned relative to the collar to permit this folding. The upper extremities 45 of the bag ends are adhered by a suitable cement or adhesive to the outer surface of the frame sides and ends, the adhesives not being illustrated in the drawing as the thickness of the cement is small relative to the thickness of the frame sides and the fabric. A pair of strips of felt 46 or other suitable material is adhered to the portions of the upper bag extremities 45 which are outwardly of the frame sides 34. The surface of one strip of felt 46 is in face contact with the surface of the adjoining sealing strip of the next bag to prevent the air and dust from being drawn into the upper portion of the cabinet between the bags. As will be noted, the collars hold the individual bags B in parallel spaced relation to permit the air to be drawn through both surfaces of the bags.

The structure thus described has the decided advantage of being low in cost, as the frame sides are identical and the end clips are also identical. Furthermore, the collars may be assembled by a simple apparatus which holds the frame sides 34 in spaced parallel relation, inserts the end clips 35 into the ends of the frame sides 34 and then crimps the frame sides as indicated at 44 to hold the end clips from being pulled from position.

I claim:
1. In combination:
a filter housing having an inlet and an outlet,
a frame supported in said housing and dividing said housing into two sections,
a series of flexible filter bags of air pervious material each including a substantially rectangular open upper end, and an elongated collar encircling said filter bag, said bag having its open end folded down and secured outwardly of said collar to encircle the same,
sealing members secured to at least one of the opposite longitudinal sides of said collar, said sealing members being secured in face contact with said downwardly folded end of said bag and sealing against adjoining collars,
each collar including a pair of elongated parallel flattened tubular frame sides having open ends,
U-shaped clips including parallel planar ends and a planar base at right angles to said planar ends, said base connecting extremities of said parallel ends,
the parallel ends of said clips extending into the open ends of said tubular frame sides to provide a rectangular frame,
means holding said parallel ends of said clips engaged in said tubular frame,
the planar base of said clips including upwardly and downwardly extending lips of a vertical length sufficient to extend substantially flush with the upper and lower surfaces of the frame sides,
air pervious means within said bags to prevent the bags from collapsing,
means in one section of said housing for drawing air through the walls of said bags from the other section thereof.

2. A filter bag collar in combination with a flexible filter bag having a substantially rectangular open upper end, the collar comprising
a pair of elongated substantially flat tubular sides having open ends, and
a pair of connecting clips,
each connecting clip comprising a U-shaped strip having parallel planar ends and a planar connecting base portion connecting end extremities of said parallel ends at right angles thereto,
the ends of said clip extending into the open ends of said flat tubular sides to hold said sides in spaced parallel relation with sides of the flat tubular sides parallel and opposed, the flat tubular sides and base portion of said clips forming a rectangular frame,
the open upper end of said bag being folded down outwardly of said collar and secured thereto,
the planar base portion of each clip including upwardly and downwardly extending lips of a vertical length to extend substantially flush with the upper and lower surfaces of said flat tubular sides.

References Cited

UNITED STATES PATENTS

| | | | |
|---|---|---|---|
| 1,529,983 | 3/1925 | Bond | 248—263 X |
| 1,573,644 | 2/1926 | Robinson | 248—263 X |
| 1,625,160 | 4/1927 | Robinson | 248—263 |
| 1,704,180 | 3/1929 | Dover | 248—263 |
| 1,713,299 | 5/1929 | Rasp | 248—255 |
| 1,790,389 | 1/1931 | Rasp | 248—255 |
| 1,814,282 | 7/1931 | Boyle | 248—262 |
| 1,837,632 | 12/1931 | Skowronski | 248—255 |
| 2,005,012 | 6/1935 | Sprinkel | 248—255 |
| 2,329,633 | 9/1943 | Masuen | 248—253 X |
| 2,470,648 | 5/1949 | Rohleder | 248—255 |
| 2,693,927 | 11/1954 | Gardner | 248—262 X |
| 2,823,762 | 2/1958 | Bunnell | 55—341 X |
| 3,166,286 | 1/1965 | Pfaff | 248—263 |
| 3,180,384 | 4/1965 | Seifert | 150—3 X |
| 3,184,052 | 5/1965 | Gledhill. | |
| 3,295,298 | 1/1967 | Mackey | 55—341 X |

HARRY B. THORNTON, Primary Examiner

D. E. TALBERT, JR., Assistant Examiner

U.S. Cl. X.R.

55—379, 374, 502; 248—99